US009016785B2

(12) United States Patent
Freisleben et al.

(10) Patent No.: US 9,016,785 B2
(45) Date of Patent: Apr. 28, 2015

(54) VEHICLE SEAT WITH A SEAT DEPTH ADJUSTING DEVICE

(75) Inventors: Bernd Freisleben, Bad Staffeistein (DE); Peter Müller, Suhl (DE); Danny Bartsch, Bad Radach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 13/881,710

(22) PCT Filed: Oct. 11, 2011

(86) PCT No.: PCT/EP2011/067714
§ 371 (c)(1),
(2), (4) Date: Jun. 11, 2013

(87) PCT Pub. No.: WO2012/055698
PCT Pub. Date: May 3, 2012

(65) Prior Publication Data
US 2013/0257126 A1    Oct. 3, 2013

(30) Foreign Application Priority Data

Oct. 25, 2010  (DE) .......................... 10 2010 042 879
Oct. 25, 2010  (DE) .......................... 10 2010 042 880

(51) Int. Cl.
*B60N 2/02*          (2006.01)
*B60N 2/62*          (2006.01)

(52) U.S. Cl.
CPC ......... *B60N 2/0232* (2013.01); *Y10T 29/49826* (2015.01); *B60N 2/0284* (2013.01); *B60N 2/62* (2013.01); *B60N 2/02* (2013.01)

(58) Field of Classification Search
CPC ..................................................... B60N 2/0284

USPC ...................... 297/284.11, 330, 337
See application file for complete search history.

(56) References Cited

U.S. PATENT DOCUMENTS 4,165,126 A * 8/1979 Strien et al. .............. 297/284.11
6,106,063 A * 8/2000 Dauphin .................. 297/284.11
(Continued)

FOREIGN PATENT DOCUMENTS

DE       41 04 697 A1    8/1992
DE       199 06 621 C2   8/2000
(Continued)

OTHER PUBLICATIONS

International Search Report, corresponding to PCT/EP2011/067714, dated Feb. 1, 2012, 4 pages.
(Continued)

*Primary Examiner* — Peter Brown
(74) *Attorney, Agent, or Firm* — Christie, Parker & Hale, LLP

(57) ABSTRACT

The invention relates to a vehicle seat with a seat pan for carrying a seat cushion of the vehicle seat, a support element adjustable along an adjustment direction relative to the seat pan for carrying an additional cushion adjustable relative to the seat cushion of the seat pan, and a seat depth adjusting means arranged on the seat pan for adjusting the support element relative to the seat pan. The seat depth adjusting means includes a guide assembly carrying the support element and an actuating assembly for actuating the seat depth adjusting means. By means of guide means the guide assembly is movably guided on the seat pan along the adjustment direction. It is provided that the guide means comprise at least one guiding device which is integrally molded into the seat pan.

18 Claims, 12 Drawing Sheets

(56) References Cited

U.S. PATENT DOCUMENTS

| | | | |
|---|---|---|---|
| 6,135,556 A * | 10/2000 | Chu et al. | 297/337 |
| 6,402,245 B1 * | 6/2002 | Newton et al. | 297/284.11 |
| 6,517,157 B1 | 2/2003 | Vorac | |
| 6,926,361 B2 | 8/2005 | Link | |
| 7,874,621 B2 * | 1/2011 | Gumbrich et al. | 297/337 |
| 7,909,401 B2 | 3/2011 | Hofmann et al. | |
| 7,938,488 B2 | 5/2011 | Thiel et al. | |
| 7,997,648 B2 | 8/2011 | Becker et al. | |
| 8,128,167 B2 * | 3/2012 | Zhong et al. | 297/284.11 |
| 8,579,373 B2 * | 11/2013 | Pradier et al. | 297/284.11 |
| 2006/0261625 A1 | 11/2006 | Kröner | |
| 2007/0102985 A1 * | 5/2007 | Taniguchi et al. | 297/423.36 |
| 2007/0108817 A1 * | 5/2007 | Lee et al. | 297/284.11 |
| 2009/0033134 A1 | 2/2009 | Hofmann et al. | |
| 2009/0152920 A1 | 6/2009 | Gumbrich et al. | |
| 2009/0200848 A1 * | 8/2009 | Kubler et al. | 297/284.11 |

FOREIGN PATENT DOCUMENTS

| | | |
|---|---|---|
| DE | 199 04 224 C1 | 9/2000 |
| DE | 100 34 441 A1 | 1/2002 |
| DE | 101 12 022 C1 | 6/2002 |
| DE | 101 23 799 C1 | 7/2002 |
| DE | 101 12 918 A1 | 10/2002 |
| DE | 102 27 730 C1 | 8/2003 |
| DE | 103 08 397 B3 | 4/2004 |
| DE | 103 10 018 A1 | 9/2004 |
| DE | 103 41 176 B3 | 1/2005 |
| DE | 10 2004 030 363 A1 | 1/2006 |
| DE | 698 30 610 T2 | 5/2006 |
| DE | 10 2005 029 665 A1 | 12/2006 |
| DE | 20 2006 001 969 U1 | 7/2007 |
| DE | 2007 002 803 U1 | 8/2007 |
| DE | 10 2006 018 353 A1 | 10/2007 |
| DE | 10 2006 056 859 B3 | 3/2008 |
| DE | 20 2007 000 484 U1 | 6/2008 |
| DE | 10 2007 049 865 A1 | 7/2008 |
| DE | 10 2008 030 608 A1 | 2/2009 |
| DE | 10 2008 046 000 A1 | 6/2009 |
| DE | 10 2008 049 923 A1 | 8/2009 |
| DE | 10 2008 041 128 A1 | 2/2010 |
| DE | 10 2009 012 780 B3 | 7/2010 |
| EP | 0 383 123 A2 | 8/1990 |
| EP | 1 984 206 B1 | 10/2008 |
| ER | 1 147 939 A2 | 10/2001 |
| WO | WO 2007/090642 A1 | 8/2007 |
| WO | WO 2010/057335 A1 | 5/2010 |

OTHER PUBLICATIONS

English translation of the International Preliminary Report on Patentability for International Application No. PCT/EP2011/067714, dated Apr. 30, 2013, 11 pages.

* cited by examiner

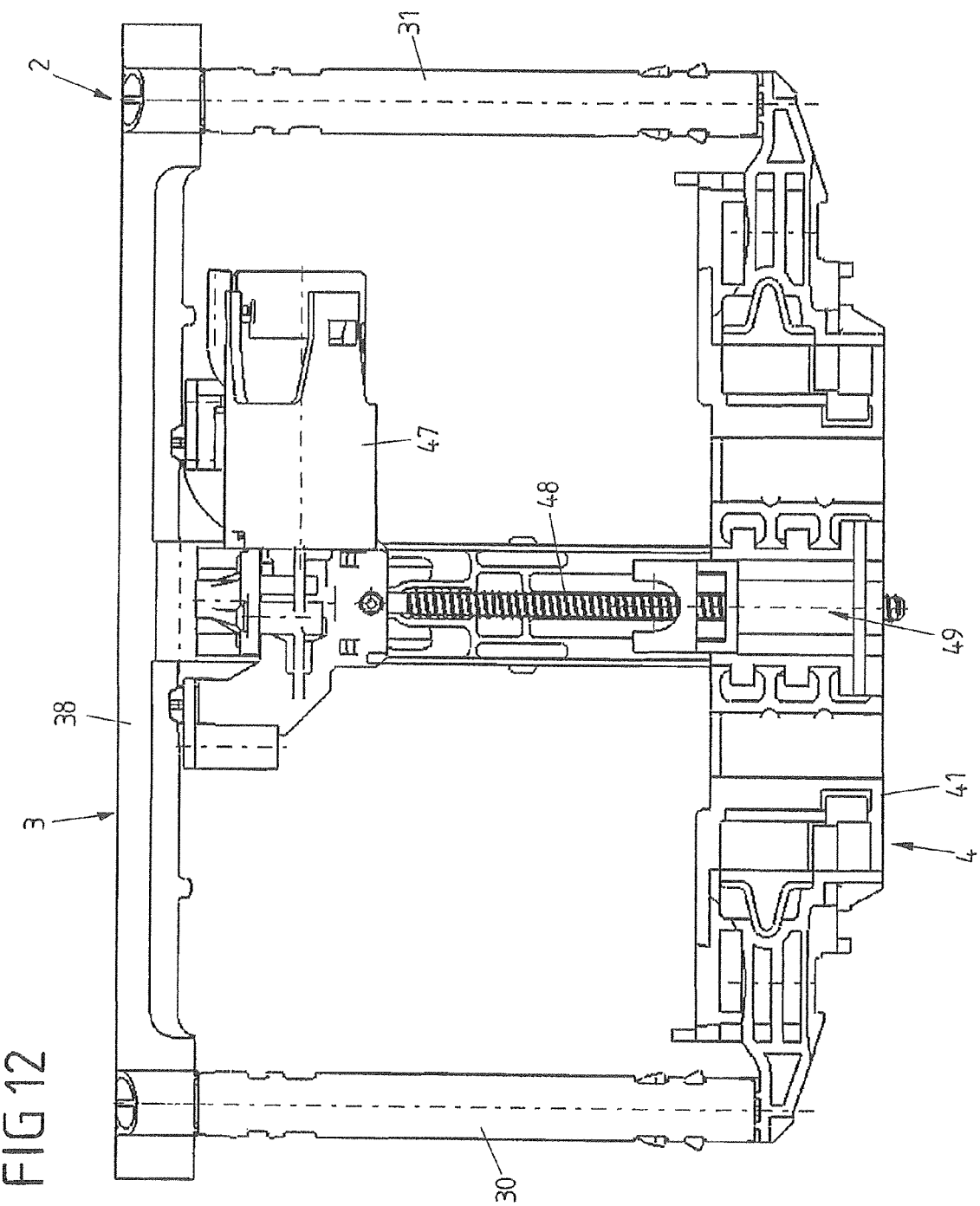

VEHICLE SEAT WITH A SEAT DEPTH ADJUSTING DEVICE

CROSS-REFERENCE TO A RELATED APPLICATION

This application is a National Phase Patent Application of International Patent Application Number PCT/EP2011/067714, filed on Oct. 11, 2011, which claims priority of German Patent Application Number 10 2010 042 880.9, filed on Oct. 25, 2010 and of German Patent Application Number 10 2010 042 879.5, filed on Oct. 25, 2010.

BACKGROUND

This invention relates to a vehicle seat and to a method for assembly of a vehicle seat.

Such vehicle seat includes a seat pan for carrying a seat cushion of the vehicle seat, a support element adjustable along an adjustment direction relative to the seat pan for carrying an additional cushion adjustable relative to the seat cushion of the seat pan, and a seat depth adjusting means arranged on the seat pan for adjusting the support element relative to the seat pan. The seat depth adjusting means comprises a guide assembly carrying the support element and an actuating assembly for actuating the seat depth adjusting means. The guide assembly of the seat depth adjusting means, which carries the support element, is movably guided along the adjustment direction by means of guiding means at the seat pan.

In a vehicle seat known from DE 103 41 176 B3, a guide assembly in the form of a cross-member and rails arranged thereon is guided on sliding guideways, which are arranged below a frame element of the vehicle seat. On the cross-member of the guide assembly, an actuating assembly is arranged in the form of a mechanical lock comprising latching elements and counter-latching elements, which can be actuated for adjusting a support element arranged on the guide assembly, so that the guide assembly can be shifted with its rails relative to the frame element.

In a seat depth adjuster known from DE 10 2005 029 665 A1, a support element is guided on a base element via different guiding devices, wherein the support element is guided not indirectly via a guide assembly carrying the support element, but directly via longitudinal guideways on the base element.

In known vehicle seats with a seat depth adjusting means, guide means are provided in the form of separate components such as guide rails or the like and arranged on a seat pan. As a result, the construction and assembly of such vehicle seats on the one hand become more complicated and on the other hand the weight is increased. In addition, a high variety of parts possibly exists—i.e. for vehicle seats, independent of whether or not a seat depth adjusting means should be provided—different components, in particular a specially adapted seat pan, must be used.

SUMMARY

It is the object of the present invention to provide a vehicle seat with a seat depth adjusting means and a method for assembly of a vehicle seat, which with a simple construction of the seat depth adjusting means provides for a weight optimization for a light-weight design of the vehicle seat with easy assembly. In addition, there should be created the possibility to use identical parts for different configurations of the vehicle seat as far as possible.

The present invention proceeds from the idea to use the seat pan as functional element of the seat depth adjusting means and to integrate guide means, which are required for guiding the guide assembly of the seat depth adjusting means along the adjustment direction, directly into the seat pan. Additional components in the form of separate guide rails or the like, which must be arranged on the seat pan, hence no longer are required.

Due to the fact that additional components in the form of guide rails or the like are saved, the weight of the vehicle seat as a whole can be reduced. The seat pan as functional element of the seat depth adjusting means performs the function of the components saved and provides the required guide means for guiding the guide assembly of the seat depth adjusting means.

The seat pan also can be employed without seat depth adjusting means, so that in the sense of a use of identical parts for reducing the variety of parts an identically constructed seat pan is used, independent of whether or not a seat depth adjusting means should be provided in a vehicle seat. This possibly also provides for a retrofittability of the vehicle seat with a seat depth adjusting means.

The guide means comprise a first guiding device, by means of which the guide assembly of the seat depth adjusting means, which carries the support element, is movably guided along the adjustment direction and which is integrally molded into the seat pan for providing a longitudinally extending guideway. The first guiding device is formed by a depression molded into the seat pan, wherein the guide assembly includes a guide web extending along the adjustment direction and connected with the support element, which is guided along the depression.

The guide web of the guide assembly is arranged above the seat pan on a side of the seat pan facing the seat cushion such that with weight forces acting on the support element in proper use the guide web is supported on the seat pan.

There is obtained an arrangement in which a longitudinally extending guide web of the guide assembly, on which for example the support element is arranged with the additional cushion adjustable relative to the seat cushion of the seat pan, is guided in a depression integrally molded into the seat pan, wherein the guide web comes to lie on a side of the seat pan facing the seat cushion, i.e. above the seat pan in the case of a proper arrangement in a vehicle, and supports the support element on the seat pan. Via the guide web, the guide assembly with the support element arranged thereon is guided on the seat pan along the adjustment direction.

The first guiding device provided by the depression of the seat pan includes an opening extending along the adjustment direction, via which the guide web of the guide assembly of the seat depth adjusting means is connected with the actuating assembly of the seat depth adjusting means. In this case, the actuating assembly is arranged below the seat pan, i.e. on the side of the seat pan facing away from the seat cushion and thus on the other side of the seat pan than the guide web of the guide assembly. To be able to connect the guide web of the guide assembly with the actuating assembly, the opening of the first guiding device is provided at the seat pan, through which suitable connecting means extend and which connects the guide web with the actuating assembly.

There is obtained an arrangement in which the guide web of the guide assembly is arranged on the one side of the seat pan facing the seat cushion and the actuating assembly, for example a locking assembly to be actuated manually or an electromotive drive assembly, is arranged on the other side of the seat pan, so that the seat pan comes to lie between the guide web and the actuating assembly.

The first guiding device can be designed such that it fixes the guide assembly of the seat depth adjusting means, which carries the support element, substantially without clearance along a support direction, in which in proper use weight forces act on the support element, and along a transverse direction vertical to the adjustment direction and to the support direction. The first guiding device thus movably guides the guide assembly along the adjustment direction, but in doing so fixes the guide assembly substantially without clearance in the plane extending transversely to the adjustment direction, so that via this first guiding device the guide assembly is supported substantially without clearance in all directions except the adjustment direction.

The first guiding device advantageously can provide a central guide for the guide assembly carrying the support element, i.e. a guide engaging the support element approximately centrally (as seen in transverse direction).

In a further aspect, the guide means can comprise a second guiding device by means of which the guide assembly of the seat depth adjusting means, which carries the support element, is movably guided along the adjustment direction, and which is molded into at least one bearing block of the seat pan for supporting a transverse tube on the seat pan. The seat pan with the bearing block arranged thereon and the integrally molded second guiding device in turn serves as functional element of the seat depth adjusting means and provides a guide for the guide assembly of the seat depth adjusting means.

In this connection, the bearing block of the seat pan for supporting a transverse tube on the seat pan, for example for supporting a transverse tube of a seat tilt or seat height adjuster of the vehicle seat, is regarded as part of the seat pan. Such bearing block can be formed integrally and in one piece with the seat pan, wherein it is also conceivable to firmly connect the bearing block with the seat pan by welding, screwing, riveting or by a unilateral or bilateral form fit, so that in the connected condition it forms an integral part of the seat pan.

The second guiding device can be formed by two guide openings, which each are molded into a bearing block of the seat pan. These guide openings are arranged spaced from each other in transverse direction transversely to the adjustment direction and transversely to the support direction, in which in proper use weight forces act on the seat cushion and the additional cushion of the vehicle seat, wherein the guide assembly of the seat depth adjusting means includes two guide tubes longitudinally extending along the adjustment direction, which are guided on the guide openings.

The second guiding device provided by the guide openings for guiding the guide tubes of the guide assembly of the seat depth adjusting means advantageously can be designed such that the first guiding device is arranged approximately centrally between the guide openings of the second guiding device in transverse direction. The first guiding device hence provides a middle, central guide, whereas the second guiding device serves the lateral guidance and support of the support element.

In this connection it should be noted that the second guiding device in principle can also be used independent of the first guiding device, the guide assembly hence exclusively can be guided with a guiding device of the type of the second guiding device described here. The first guiding device and the second guiding device can, however, also be used in combination with each other, or it is possible to merely use one of the guiding devices—possibly also in combination with a completely different type of guiding device.

In proper use and with a proper arrangement of the vehicle seat in a vehicle, the guide tubes of the second guiding device can extend below the seat pan on a side of the seat pan facing away from the seat cushion. When the second guiding device thus is used in combination with the first guiding device, the guide tubes extend below the seat pan and correspondingly are guided in bearing blocks with guide openings below the seat pan, whereas via the first guiding device a support advantageously is created above the seat pan via the guide web of the guide assembly. The first guiding device and the second guiding device thus are arranged on different sides of the seat pan, namely on the one hand on a side of the seat pan facing the seat cushion (first guiding device) and on the other hand on a side of the seat pan facing away from the seat cushion (second guiding device).

The guide tubes advantageously each are connected with the actuating assembly with their one end and with a cross-beam of the guide assembly with their other end.

While the actuating assembly serves the actuation of the seat depth adjusting means in a manual or electromotively operated way (depending on the design of the actuating assembly as manual locking assembly or as electromotively driven drive assembly), the guide assembly serves to carry the support element and correspondingly is supported on the seat pan via the guide means, in order to dissipate weight forces introduced by the support element in proper use into the seat pan. For this purpose, the support element can be connected with the guide assembly at suitable fixing points, wherein advantageously two fixing points are provided on the cross-beam of the guide assembly at those places at which the guide tubes are connected with the cross-beam. In addition, a portion longitudinally extending from the cross-beam, arranged between the guide tubes as seen transversely to the adjustment direction, is provided on the cross-beam, on which a further fixing point is created for connection of the support element, which is offset to the fixing points of the cross-beam along the adjustment direction.

This further fixing point in particular can be offset with respect to the fixing points provided on the cross-beam such that—when the cross-beam is arranged on a front edge portion of the support element located away from the seat pan—the further fixing point is offset from the front edge portion of the support element towards the seat pan along the adjustment direction, i.e. is indented from the front edge portion of the support element towards the seat pan, so that a support of the support element is created in the manner of a three-point support.

The fixing points for example can be designed as clip elements for the latching, positive connection of the support element with the guide assembly. In this way, the support element can easily be attached to the guide assembly without use of special tools, wherein an additional cushion already can be mounted on the support element, which is connected with a seat cushion arranged on the seat pan for example via a so-called crumb crease and can be adjusted relative to the seat cushion for the purpose of adjusting the seat depth, i.e. the effective length of a seat surface for a seat user.

The second guiding device advantageously can be designed such that it guides the guide assembly of the seat depth adjusting means, which carries the support element, substantially without clearance along a support direction, in which in proper use weight forces act on the support element, but with clearance along a transverse direction vertical to the adjustment direction and to the support direction. In contrast to the first adjusting means described above, the second guiding device hence merely provides a support in the support direction for dissipating the weight forces acting in proper use, but provides no support in transverse direction. This serves to avoid an overdetermination in the case of a combined guidance by using the first guiding device and the second guiding device, due to which canting might occur when shifting the support element upon actuation of the seat depth adjusting means. Due to the fact that the second guiding device has a clearance in transverse direction, such overdetermination is avoided and the risk of canting is largely reduced. The second guiding device hence exclusively serves for supporting the acting weight forces, but not for transverse guidance.

As indicated already, the actuating assembly of the seat depth adjusting means can be formed for the manual actuation or for the electromotive actuation. In the first case it realizes a locking assembly, in which locking is released manually and the guide assembly with the support element arranged thereon can be moved manually. In the second case it realizes an electromotively operated drive assembly, in which the guide assembly with the support element arranged thereon can be adjusted electromotively.

In a manually actuatable actuating assembly, the actuating assembly in a concrete configuration can include at least one latching rail, a carrier movably guided on the at least one latching rail, and an actuating element movably arranged on the carrier. The actuating element here is formed to cooperate with at least one locking bolt shiftably mounted on the carrier, which in a locked condition of the actuating assembly is in locked engagement with the at least one latching rail and in an unlocked condition is not in engagement with the at least one latching rail. For attaching the actuating assembly to the seat shaft, the at least one latching rail is connected with the seat pan, so that the actuating assembly thereby is held at the seat pan.

In a concrete configuration of an electromotively actuatable actuating assembly, the actuating assembly however can include a spindle, an electromotive drive unit for driving the spindle into a rotary movement, and a carrier movable along the adjusting means, which is in engagement with the spindle via a spindle nut. In this case, the electromotive drive unit is connected with the seat pan for attaching the actuating assembly to the seat pan, so that the actuating assembly thereby is fixed at the seat pan.

The guide assembly and the carrier of the actuating assembly are independent of the configuration of the actuating assembly for the manual or for the electromotive actuation. In the electromotive actuating assembly, as compared to the manual actuating assembly, merely the latching rails and the actuating element are replaced by the spindle and the electromotive drive unit. The construction of the carrier of the actuating assembly and the construction of the guide assembly are not changed thereby. By this use of identical parts, a reduction of the variety of parts can be achieved on the whole and hence the manufacturing expenditure can be reduced.

The method proceeds from the idea to use a seat depth adjusting means in modular construction. A first module represents a guide assembly which serves for carrying the support element and in the mounted condition guides the support element on the seat pan. The guide assembly performs the essential functions of supporting the support element and of introducing weight forces acting on the support element into the seat pan. A second module is created by the actuating assembly, which comprises the mechanism for adjusting the guide assembly and can be formed to be actuatable electrically or manually.

For assembly, the modules of the seat depth adjusting means are arranged on the seat pan of the vehicle seat in a modular fashion in separate steps. In a first step, the actuating assembly of the seat depth adjusting means is attached to the seat pan, for example screwed to the seat pan. In a second step, the guide assembly of the seat depth adjusting means then is arranged on the seat pan, wherein for this purpose the guide assembly is brought in engagement with the guide means and subsequently connected with the actuating assembly arranged already on the seat pan. Finally, the support element is attached to the guide assembly.

The support element can be arranged on the guide assembly together with an additional cushion arranged thereon. It is conceivable and expedient that the seat pan together with the seat depth adjusting mechanism mounted thereon is supplied by a manufacturer of the seat depth adjusting means to a final manufacturer of the vehicle seat and in connection with the final assembly the support element already upholstered with the additional cushion is arranged on the guide assembly by the final seat manufacturer. This is expedient in particular when the additional cushion for example is connected with the seat cushion of the vehicle seat via a cushion cover and thus is to be arranged on the vehicle seat together with the seat cushion.

It is, however, also conceivable to already fix the support element on the guide assembly on the part of the manufacturer of the seat depth adjusting means and supply the same in this way, wherein an additional cushion arranged already on the support element and not connected with the seat cushion then is joined with the seat cushion only on the part of the seat manufacturer or the support element only subsequently is upholstered with the additional cushion on the part of the final seat manufacturer.

In this connection, another sequence of the steps also is conceivable. For example, the support element can be arranged on the guide assembly, before the guide assembly is arranged on the seat pan.

Due to the fact that the assembly of the vehicle seat with the seat depth adjusting means to be arranged thereon is effected in a modular way, the assembly is reduced to a few steps, namely the step of attaching the actuating assembly to the seat pan, the step of mounting the guide assembly on the seat pan, and the step of attaching the support element to the guide assembly. By using individual modules in the form of the actuating assembly and the guide assembly of the seat depth adjusting means it also becomes possible to selectively equip a vehicle seat with or without seat depth adjusting means, wherein the construction of the seat pan need not be changed for this purpose. If a seat depth adjusting means is to be provided, the individual assemblies of the seat depth adjusting means are arranged on the seat pan. However, if no seat depth adjusting means is to be provided, the seat pan is not equipped with the assemblies, without otherwise having to adapt the construction of the seat pan.

The guide assembly preferably is arranged on the guide means along the adjustment direction, in order to be connected with the actuating assembly. For this purpose, the actuating assembly can be attached below the seat pan on a side of the seat pan facing away from the seat cushion in the case of a proper arrangement, wherein the guide assembly is arranged on the guide means from a front side of the seat pan in the case of a proper arrangement in the vehicle, in order to then be brought in engagement with the actuating assembly arranged below the seat pan.

The guide assembly includes a guide web which longitudinally extends along the adjustment direction and is connected with a cross-beam of the guide assembly. For assembly, the guide web is arranged on a first guiding device, which in proper use is arranged on a side of the seat pan facing the seat cushion, and the guide web is connected with a carrier of the actuating assembly movably guided on the seat pan, in that the guide web is connected with the carrier of the actuating assembly via an opening of the first guiding device molded into the seat pan.

In addition, the guide assembly can include at least one guide tube which for assembly is arranged on guide means on the seat pan together with the guide web, advantageously inserted into suitable guide means, in order to then each be connected with the carrier of the actuating assembly at its end facing away from the cross-beam of the guide assembly.

The at least one guide tube advantageously can be attached to a second guiding device, which in proper use is arranged on a side of the seat pan facing away from the seat cushion, wherein the first guiding device and the second guiding device can be formed as depressions or openings at the seat pan, into which the guide web or the at least one guide tube are inserted.

The guide web and the at least one guide tube each are connected with the actuating assembly, in particular the carrier of the actuating assembly, so that the guide web and the guide tube at their one end each are connected with the cross-beam of the guide assembly and at their respective other end are connected with the carrier of the actuating assembly. The connection of the guide web and the at least one guide tube with the carrier of the actuating assembly for example can latchingly be effected in a positive way.

The guide web is guided on the first guiding device on the side of the seat pan facing the seat cushion and thus extends above the seat pan. The actuating assembly, on the other hand, preferably is arranged below the seat pan, so that in this case the guide web is connected with the actuating assembly via an opening molded into the seat pan and longitudinally extending along the adjustment direction in the manner of a slotted guide of the first guiding device.

The second guiding device can be formed by a guide opening molded into a bearing block of the seat pan for supporting a transverse tube, wherein the bearing block preferably is arranged below the seat pan. For assembly, the at least one guide tube is inserted into the guide opening, in order to then be connected with the carrier of the actuating assembly with its end facing away from the cross-beam of the guide assembly.

When the actuating assembly is attached to the seat pan and the guide assembly is arranged on the guide means of the seat pan and connected with the actuating assembly, the support element is attached to the guide assembly. Preferably, the support element here can be clipped to the guide assembly, i.e. be positively connected with the guide assembly via suitable latching elements.

BRIEF DESCRIPTION OF THE DRAWINGS

The idea underlying the invention will be explained in detail below with reference to the exemplary embodiments illustrated in the Figures, in which:

FIG. 12 shows a view from below of the seat depth adjusting means of FIG. 11 without bearing blocks for guiding the guide assembly.

DETAILED DESCRIPTION

Figure 1:
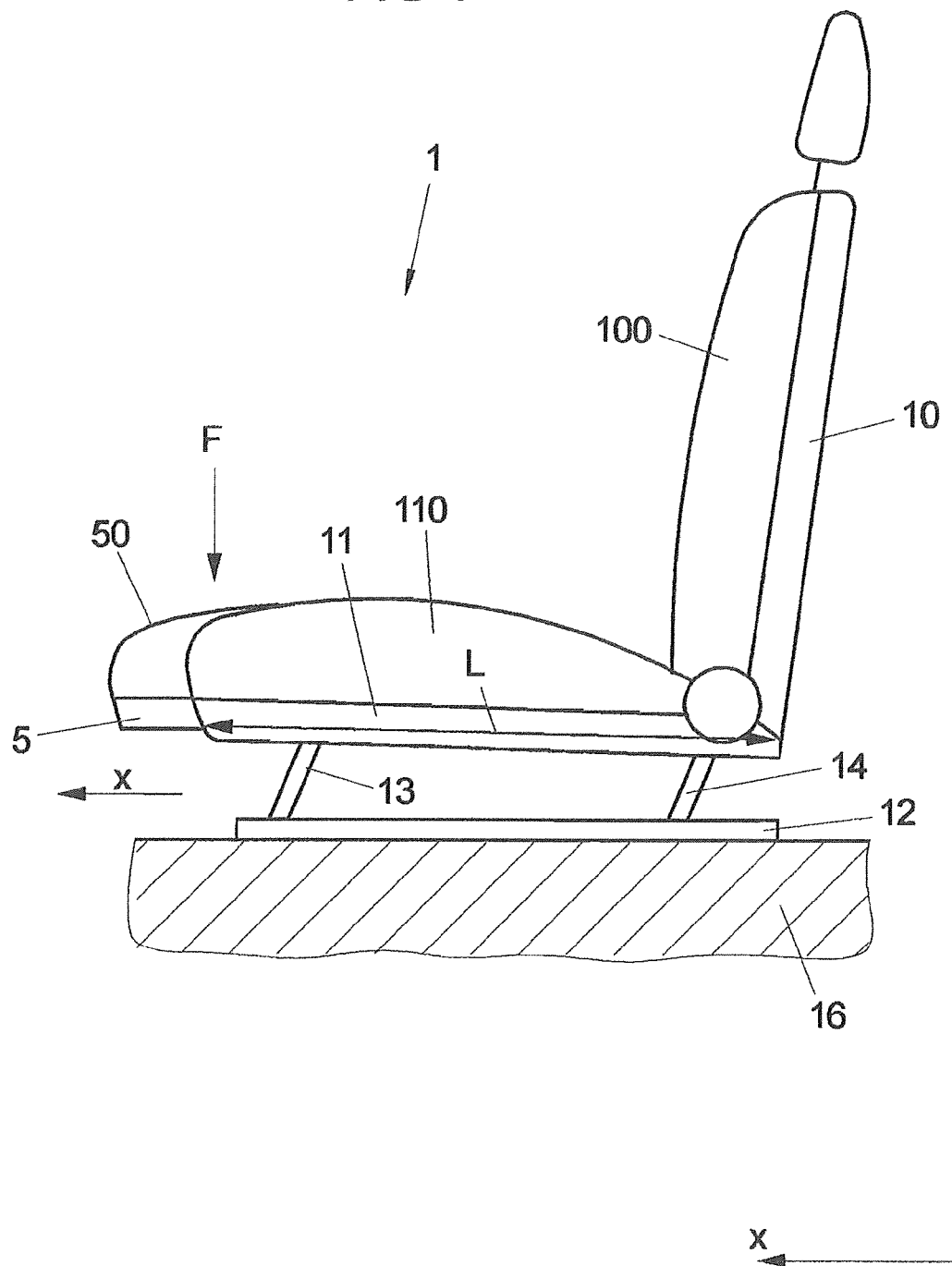
FIG. 1 shows a schematic view of a vehicle seat with a seat depth adjusting means.

FIG. 1 shows a vehicle seat 1 which comprises a seat base 11 arranged on a longitudinal adjusting device 12 via links 13, 14 as well as a backrest 10 pivotally attached to the seat base 11. The longitudinal adjusting device 12 here is connected with a vehicle floor 16 of a vehicle. The seat base 11 carries a seat cushion 110, on which a vehicle occupant can sit down, and the backrest 10 carries a backrest cushion 100 for supporting the back of the vehicle occupant.

In the vehicle seat 1 schematically shown in FIG. 1, the effective length L of the seat cushion available for a seat user is adjustable in longitudinal seat direction (corresponding to the longitudinal vehicle direction or the direction of travel in a seat mounted in a motor vehicle) in that a support element 5 is longitudinally shiftably mounted on the seat base 11, which carries an additional cushion 50 adjoining the seat cushion 110 in longitudinal seat direction and which is shiftable in an adjustment direction x corresponding to the longitudinal seat direction. The effective length L of the entire seat cushion 110, 50, on which a seat user can sit down, depends on how far the support element 5 is extended in the adjustment direction x.

In the present case, the support element 5 is a so-called thigh support which serves for supporting the thighs of a seat user and which for adjusting the effective length L of the entire seat cushion, i.e. for a so-called seat cushion depth adjustment, is movably mounted in the adjustment direction x. The smallest adjustable effective length L of the seat cushion 110, 50 in adjustment direction x corresponds to the so-called minimum extension of the support element 5 and the maximum adjustable effective length L of the seat cushion 110, 50 corresponds to the so-called maximum extension of the support element 5.

When a vehicle occupant is sitting on the vehicle seat 1 shown in FIG. 1, weight forces F are acting on the seat cushion 110 and especially also on the additional cushion 50 and the support element 5 along a support direction z corresponding to the vertical direction. This approximately corresponds to the direction of an upright backrest 10 of the vehicle seat 1 or the so-called vertical vehicle axis—based on the vehicle seat 1 mounted in a motor vehicle.

A first concrete exemplary embodiment of a seat depth adjusting means for adjusting a support element 5 relative to a seat pan 6 forming a part of the seat base 11, on which a seat cushion 110 is to be arranged, is shown in FIGS. 2 to 10.

Figure 4:
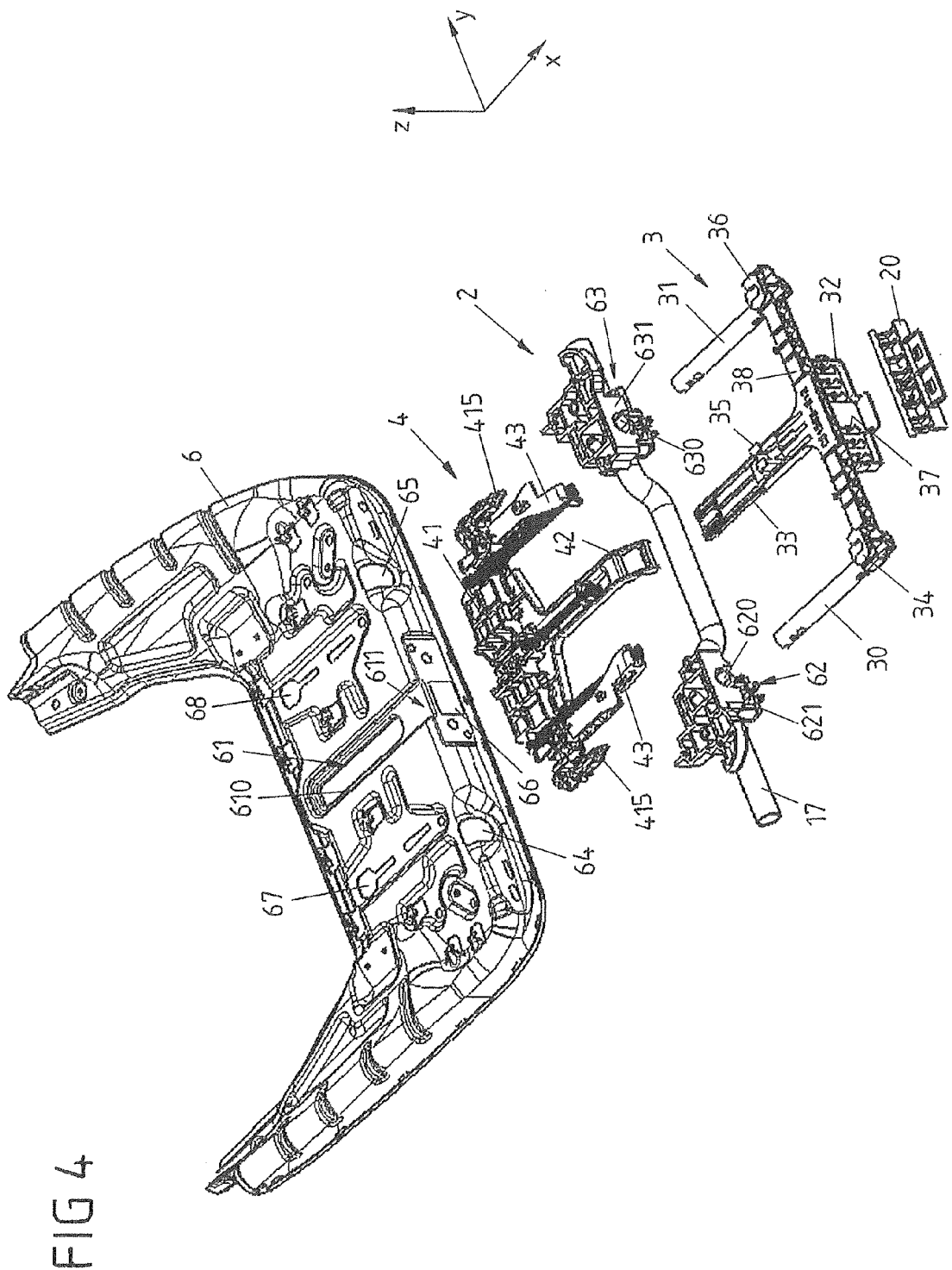
FIG. 4 shows an exploded view of a seat pan, an actuating assembly, a guide assembly and a transverse tube mounted on the seat pan via bearing blocks.

The seat depth adjusting means 2 has a modular construction, as shown for example in FIG. 4, and includes a guide assembly 3, on which the support element 5 is arranged via fixing points 34, 35, 36, and an actuating assembly 4 for actuating the seat depth adjusting means 2, which in the concrete exemplary embodiment is designed as manually actuatable actuating assembly in the manner of a mechanical locking device.

In the mounted condition, the actuating assembly 4 is arranged below the seat pan 6, i.e. on a side of the seat pan 6 facing away from the seat cushion 110, and includes a carrier 41 which on latching rails 43 firmly connected with the seat pan 6 is movably guided along the adjustment direction x. In the mounted condition, the guide assembly 3 is connected with this carrier 41 of the actuating assembly 4 via guide tubes 30, 31, wherein the guide tubes 30, 31 are positively retained at connecting pins 415 arranged on the carrier 41 of the actuating assembly 4.

Figure 2:
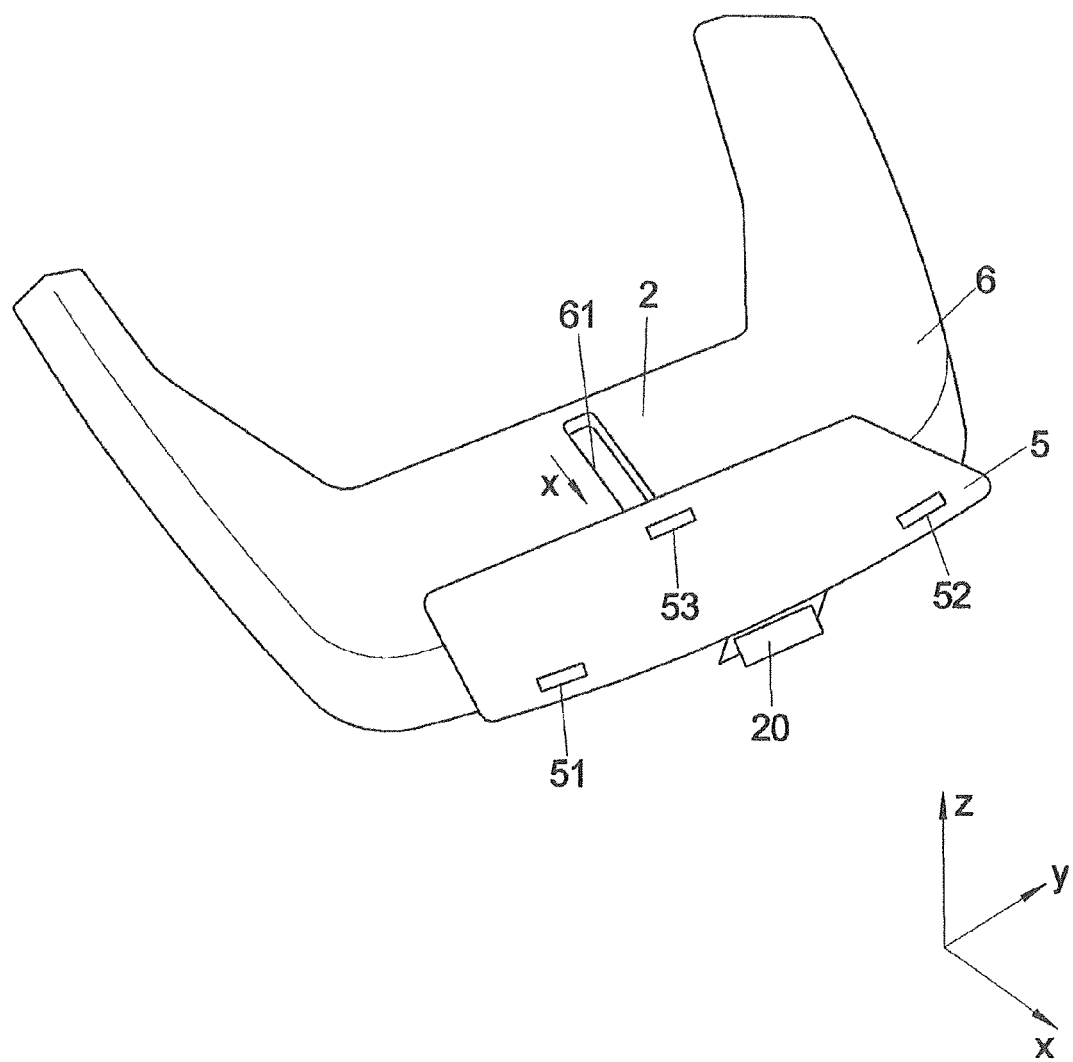
FIG. 2 shows a schematic perspective view of a seat pan of a vehicle seat with support element arranged thereon.
Figure 3:
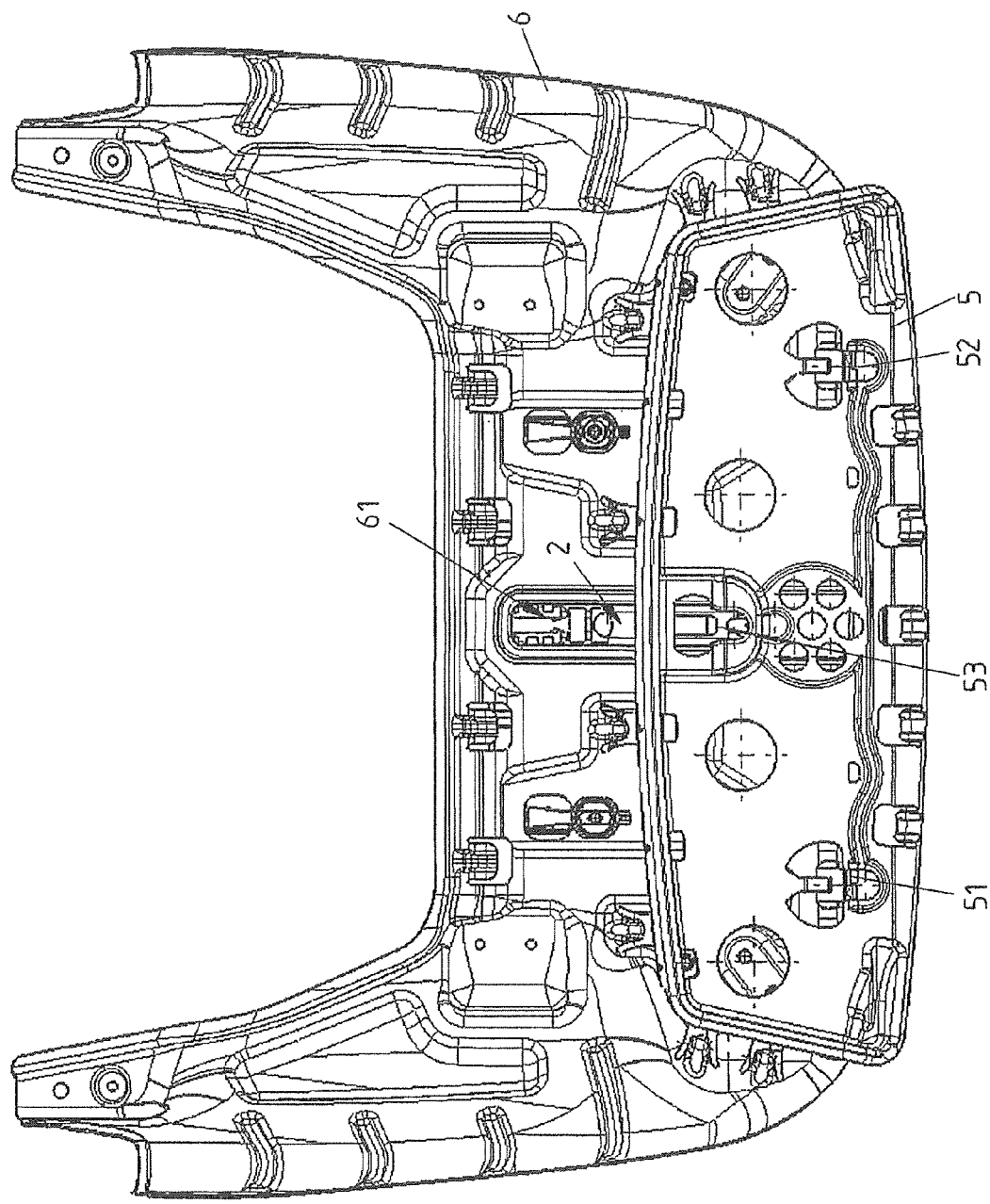
FIG. 3 shows a top view of a seat pan with support element arranged thereon.

The guide assembly 3 serves for guiding and connecting the support element 5 with the seat pan 6, on which, as shown in FIGS. 2 and 3, the support element 5 is guided along the adjustment direction x. The guide assembly 3 includes a cross-beam 38 connecting the guide tubes 30, 31 with each other and a guide web 33 arranged on the cross-beam 38, which in the mounted condition comes to lie above the seat pan 6, i.e. on the side of the seat pan 6 facing the seat cushion 110. The support element 5 is connected, in particular clipped, with the fixing points 34, 35, 36 of the guide assembly 3 via fixing points 51, 52, 53.

The seat pan 6 provides guide means for guiding the guide assembly 3 along the adjustment direction x corresponding to the longitudinal seat direction and in this way serves as functional element of the seat depth adjusting means 2. At the seat pan 6 two different guiding devices 61, 62, 63 are realized, which on the one hand serve for guiding the guide web 33 and on the other hand for guiding the guide tubes 30, 31 of the guide assembly 3.

A first guiding device 61 of the seat pan 6 is realized by a depression 611 molded into the seat pan 6, which is arranged on the side of the seat pan 6 facing the seat cushion 110 (with proper arrangement of the seat cushion 110 on the seat pan 6), extends along the adjustment direction x and includes an opening 610. This first guiding device 61 serves for guiding the guide web 33 of the guide assembly 3 along the adjustment direction x.

A second guiding device 62, 63 is realized by guide openings 620, 630 which are molded into bearing blocks 621, 631 of the seat pan 6. These bearing blocks 621, 631 serve to support a transverse tube 17 of a seat height or seat tilt adjuster of the vehicle seat 1 (the transverse tube 17 for example can be connected with front links 13 for the seat height adjustment of the vehicle seat 1, see FIG. 1), are firmly connected with the seat pan 6 and thus are regarded as part of the seat pan 6. Into the bearing blocks 621, 631, which for example are formed of plastics, the guide openings 620, 630 are molded, through which the guide tubes 30, 31 of the guide assembly 3 extend in the mounted condition.

The guide tubes 30, 31 guided at the guide openings 620, 630 each are formed as longitudinally extending hollow body with a circular cross-section, advantageously made of a metal, for example steel or aluminum, and thus designed for supporting weight forces F, which act in vertical direction z, on the guide openings 620, 630. By a suitable choice of the diameter and the wall thickness, the guide tubes 30, 31 can be adapted to the respective strength requirements.

Due to the fact that the guiding devices 61, 62, 63 are integrally molded into the seat pan 6 (which also includes the bearing blocks 621, 631), additional components such as guide rails or the like for guiding the guide assembly can be omitted. With its guide tubes 30, 31 and its guide web 33 the guide assembly 3 rather is directly guided on the seat pan 6, without additional components being required for this purpose on the seat pan 6, so that components and weight can be saved.

For assembly, the actuating assembly 4 (whose mode of function will still be explained in detail below) is arranged on the seat pan 6 from below and connected with the seat pan 6, for example screwed or latched, in that the latching rails 43 of the actuating assembly 4 are fixed at the seat pan 6 via fixing points 67, 68. On the latching rails 43 the carrier 41 of the actuating assembly 4 is adjustably guided along the adjustment direction x and thus is retained at the seat pan 6 via the latching rails 43.

Then, the guide assembly 3 is arranged on the seat pan 6 from the front against the adjustment direction x indicated in FIG. 4, in that the guide tubes 30, 31 are guided through openings 64, 65 on a front end face of the seat pan 6 and through the guide openings 620, 630 of the bearing blocks 621, 631, wherein at the same time the guide web 33 is inserted into the depression 611.

Figure 5:
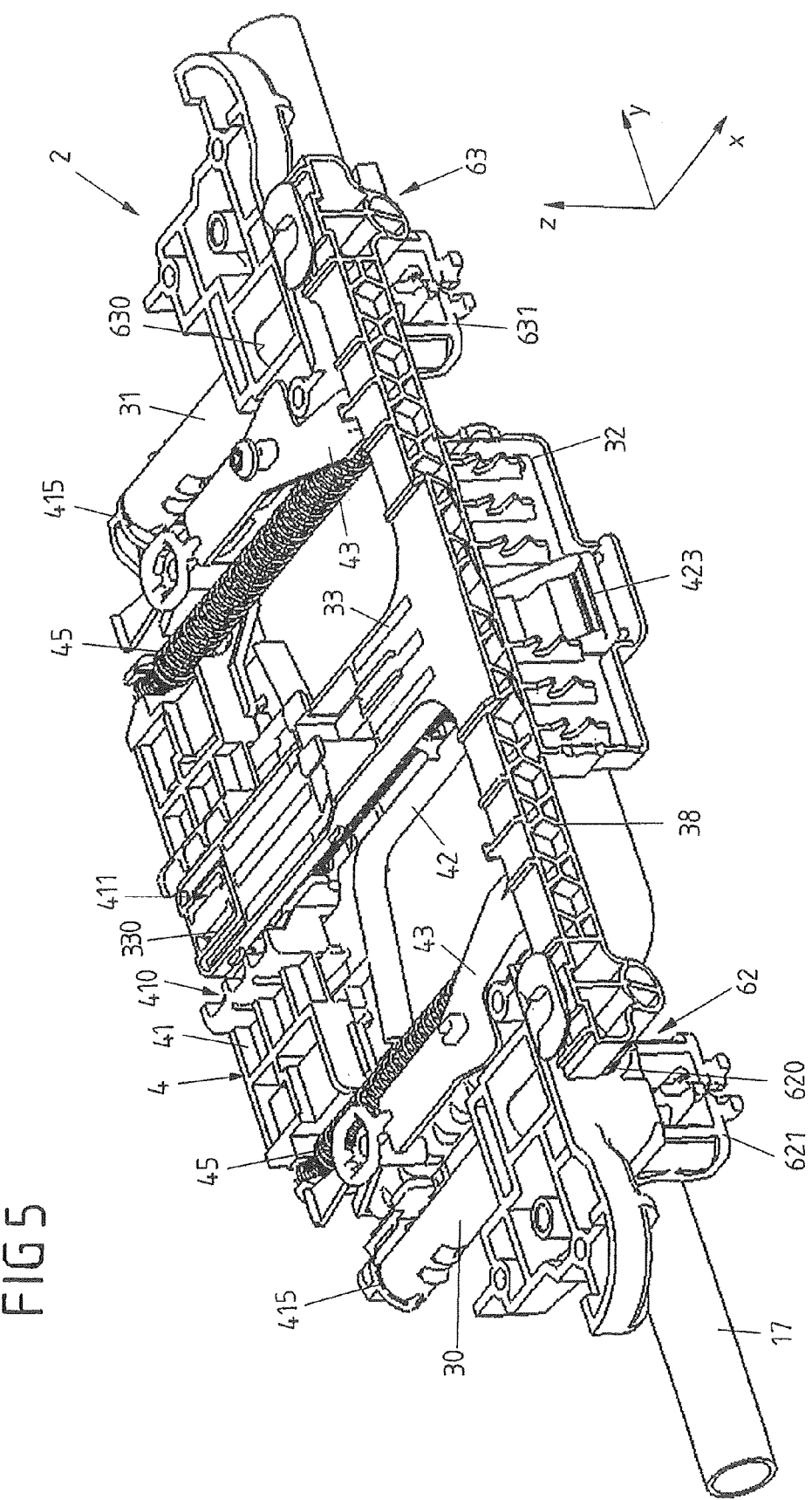
FIG. 5 shows a perspective view of a seat depth adjusting means.
Figure 6:
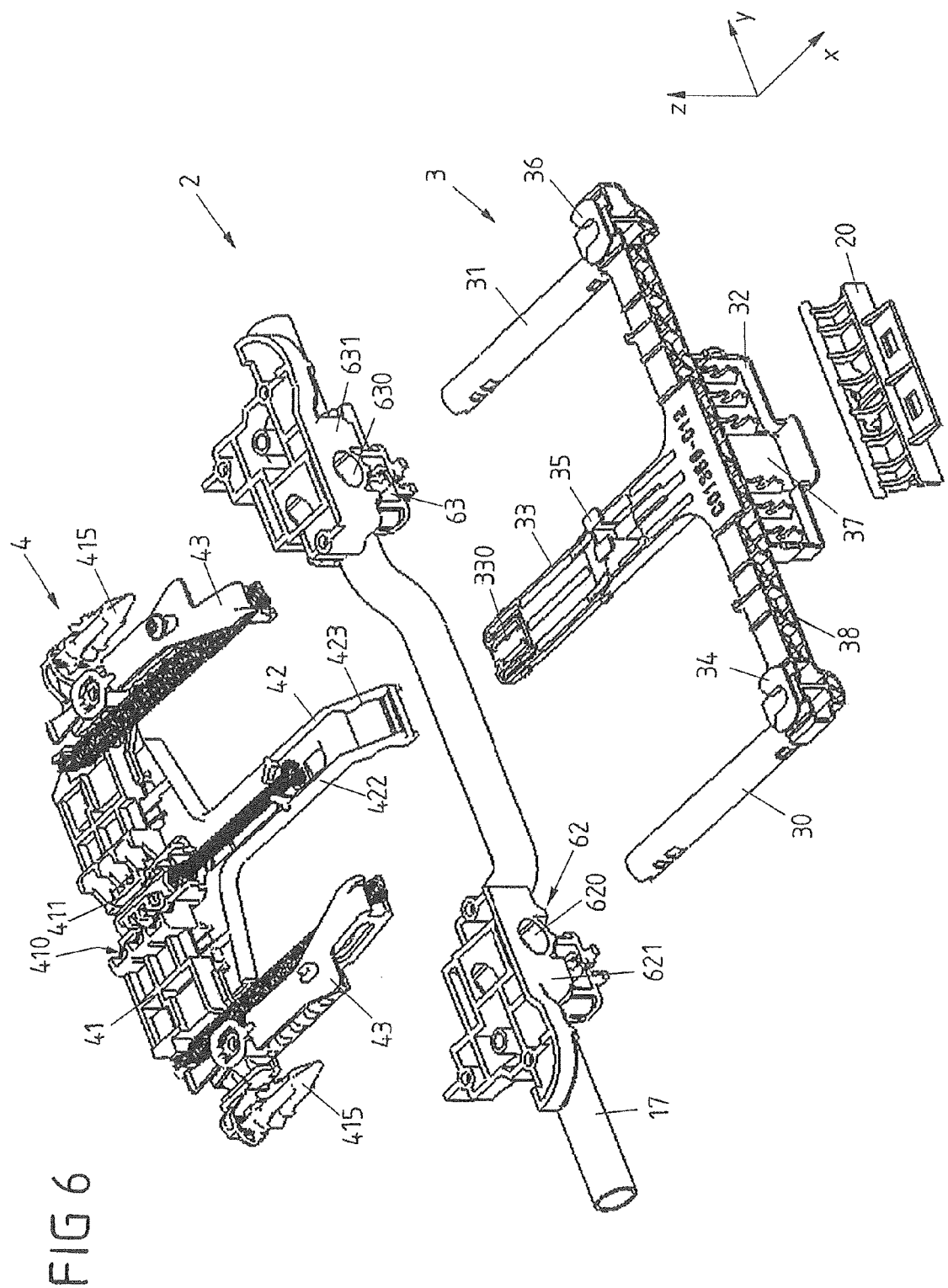
FIG. 6 shows an exploded view of the adjusting means of FIG. 5 with an actuating assembly, a guide assembly and bearing blocks of the seat pan for guiding the guide assembly.

To bring the guide assembly 3 in connection with the actuating assembly 4, the guide tubes 30, 31, as shown in FIGS. 5 and 6, are guided through the guide openings 620, 630 and arranged on the connecting pins 415 of the carrier 41 of the actuating assembly 4, which latchingly get in engagement with the guide tubes 30, 31 and thus create a positive connection of the carrier 41 with the guide tubes 30, 31. At a fixing point 330, the guide web 33 additionally is brought in engagement with a latching element 411 of the carrier 41 of the actuating assembly 4 extending through the opening 610 of the depression 611.

On the carrier 41 of the actuating assembly 4 an actuating element 42 is arranged for actuating the actuating assembly 4, which with an arm 422 extends from the carrier 41 towards the front end face of the seat pan 6 and with a nose 423 extends through an opening (see FIG. 4) in this front end face of the seat pan 6. When the guide assembly 3 is connected with the actuating assembly 4, the nose 423 engages into an opening 37 on a handle holder 32 of the guide assembly 3 and is connected with a handle 20 which in addition is pivotally articulated to the handle holder 32 about an axis directed along the transverse direction y.

When the guide assembly 3 is arranged on the seat pan 6 and brought in connection with the actuating assembly 4 via the fixing pins 415 and the latching element 411, the support element 5 possibly upholstered already with the additional cushion 50 is clippingly attached to the guide assembly 3 via the fixing points 34, 35, 36, 51, 52, 53, so that, as shown in the mounted condition according to FIGS. 2 and 3, the support element 5 is guided on the seat pan 6 via the guide assembly 3.

The fixing point 35 at the guide web 33 of the guide assembly 3, as shown for example in FIG. 4, is offset to the rear relative to the fixing points 34, 36 on the cross-beam 38. As shown in FIG. 3, a three-point support is created via the connection of these fixing points 34, 35, 36 with the fixing points 51, 52, 53 of the support element 5, which creates an advantageous support when the support element 5 is loaded by weight forces F of a vehicle occupant.

The modular construction of the seat depth adjusting means 2 on the one hand provides for an easy assembly. On the other hand, the seat pan 6 selectively can be used with or without seat depth adjusting means 2 with otherwise identically constructed seat pan 6.

A manufacturer of the seat depth adjusting means 2 for example can supply the seat pan 6 together with the adjusting mechanism already arranged thereon in the form of the guide assembly 3 and the actuating assembly 4 to a final manufacturer of the vehicle seat 1. The support element 5 is not delivered in particular when the additional cushion 50 arranged on the support element 5 for example is connected with the seat cushion 110 of the seat base 11 via a so-called crumb crease, i.e. a cover portion of the cushion cover. The seat cushion 110 only will be arranged on the seat base 11 (and hence also to the seat pan 6, which is part of the seat base 11) on the part of the final seat manufacturer, and in this connection the support element 5 upholstered already with the additional cushion 50 will be attached to the guide assembly 3.

When the additional cushion 50 is not connected with the seat cushion 110 for example via a cushion cover and the additional cushion 50 and the seat cushion 110 thus are present separately, it is also conceivable to connect the support element 5 together with the additional cushion 50 arranged thereon with the guide assembly 3 already on the part of the manufacturer of the seat depth adjusting means 2 and deliver the same in this way.

Possibly, it is also conceivable to arrange the support element 5 on the guide assembly 3 already on the part of the manufacturer of the seat depth adjusting means 2 and deliver the same in this way, but then to upholster the support element 5 only subsequently on the part of the final seat manufacturer.

The construction of the actuating means 4 will be explained with reference to FIGS. 6 to 8. The actuating assembly 4 here realizes a mechanical locking device, which can be actuated manually and by means of which the guide assembly 3 together with the support element 5 arranged thereon can be adjusted along the adjustment direction x.

Figure 7:
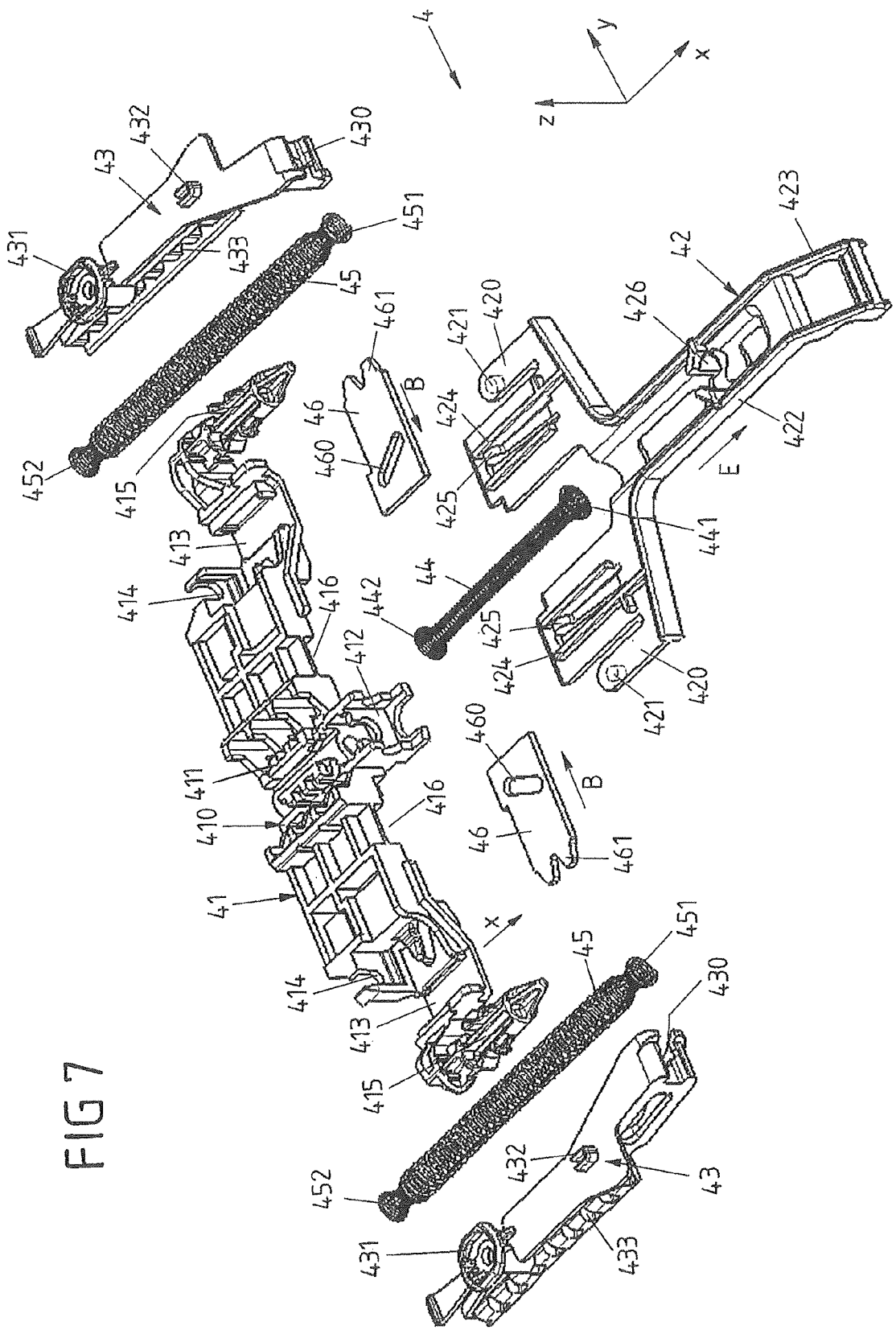
FIG. 7 shows an exploded view of the actuating assembly.

As can be taken from the exploded view of FIG. 7, the latching rails 43 of the actuating assembly 4 are positively and non-adjustably fixed at the seat pan 6 via latching elements 431 and centering pins 432. Via bearing points 413, the carrier 41 is guided on the latching rails 43 along the adjustment direction x and retained at the seat pan 6 via the latching rails 43. The carrier 41 in addition is pretensioned with respect to each latching rail 43 via a spring 45, wherein the spring 45 is fixed with a first end 451 at a spring holder 430 of the respectively associated latching rail 43 and with a second end 452 at a spring holder 414 of the carrier 41.

On the carrier 41 the actuating element 42 is arranged, wherein the actuating element 42 is movable relative to the carrier 41 by a predetermined distance along the adjustment direction x and for this purpose is shiftably guided on bearing points 416 of the carrier 41 via guiding devices 424 and latching noses 425. The actuating element 42 serves the actuation of locking bolts 46, which are movably arranged on the carrier 41 along the transverse direction y and are operatively connected with the actuating element 42 via coulisses 460, into which pins 421 at lips 420 of the actuating element 42 engage. The actuating element 42 is pretensioned with respect to the carrier 41 via a spring, wherein the spring 44 is connected with a first end 441 at a spring holder 426 of the actuating element 42 and with a second end 442 with a spring holder 412 of the carrier 41.

Figure 8:
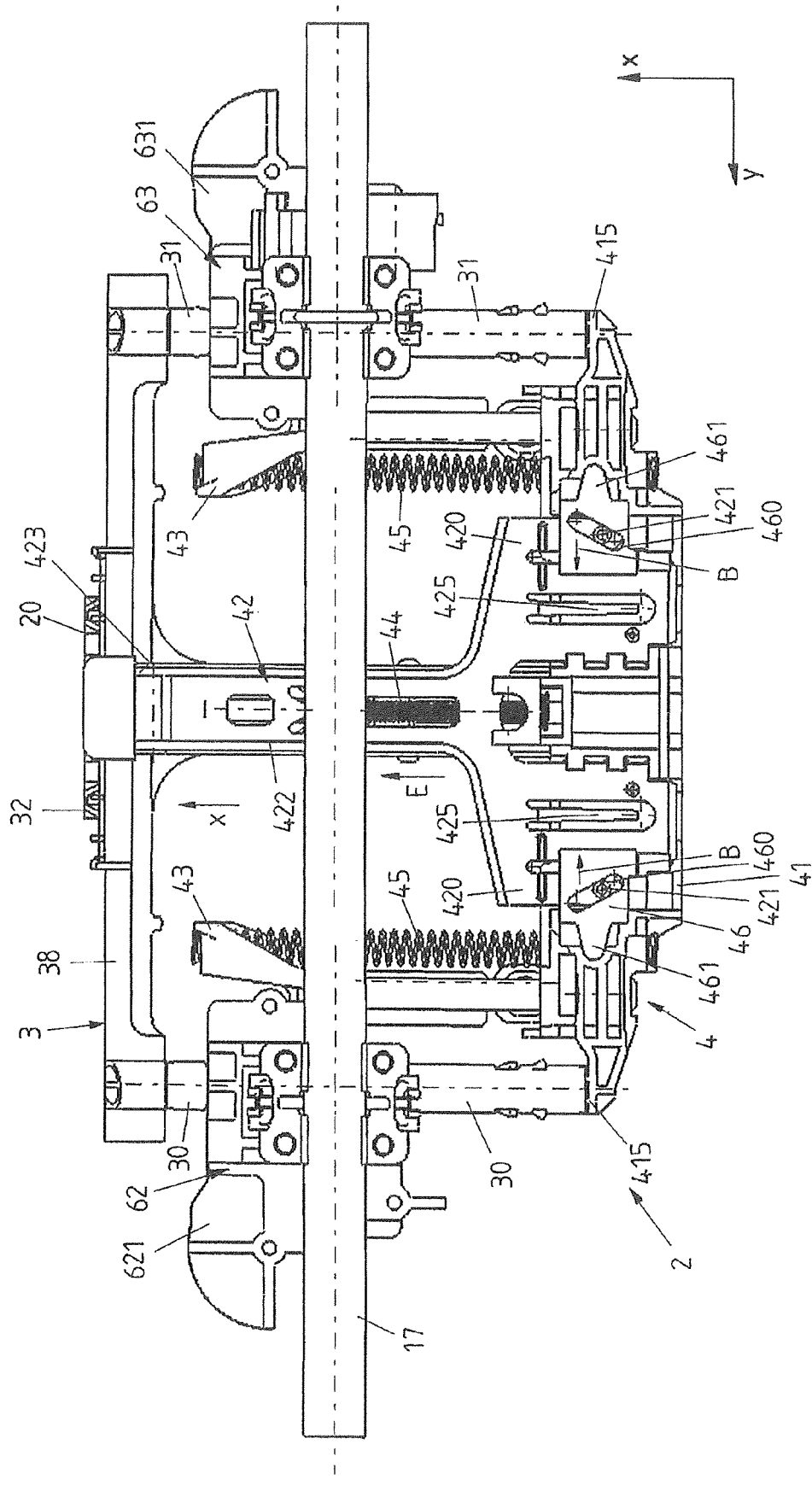
FIG. 8 shows a view of the seat depth adjusting means from below.
Figure 9:
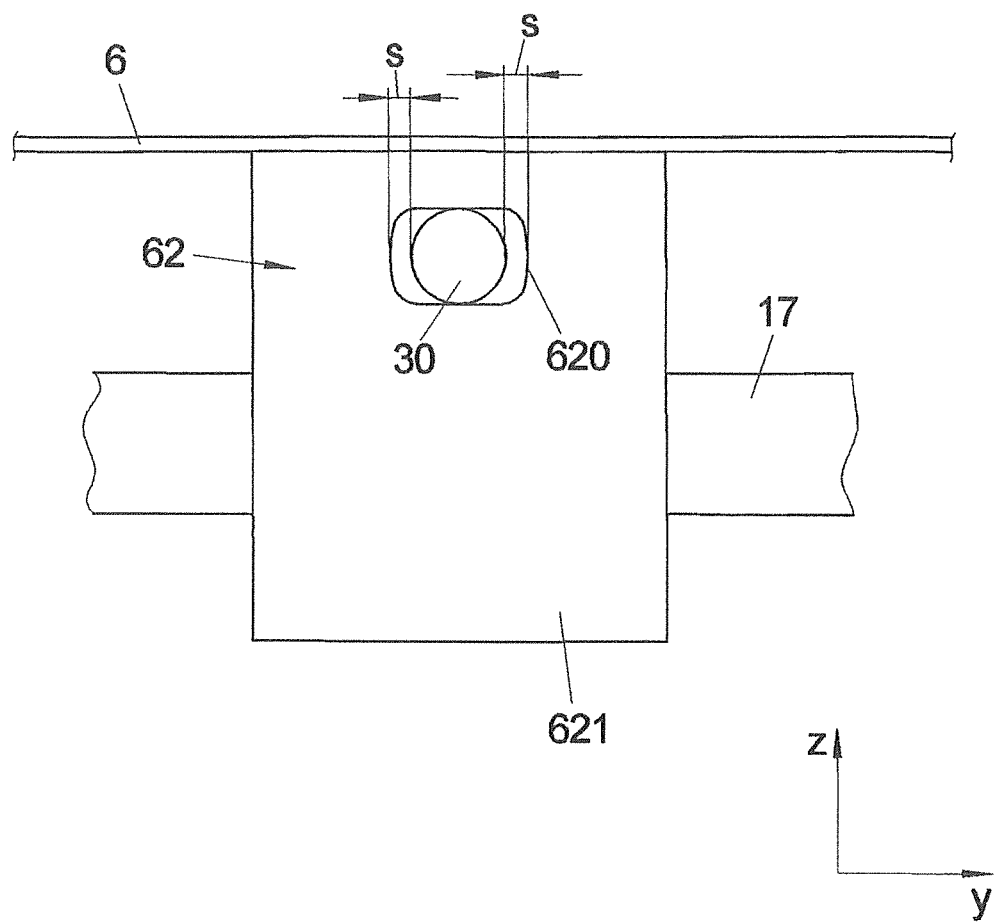
FIG. 9 shows a schematic view of the guidance of a guide tube of the guide assembly on a bearing block.

For explanation of the mode of function of the actuating assembly 4 reference is made to FIGS. 7 and 8.

In a locked condition, the locking bolts 46 shiftably arranged on the carrier 41 are in engagement with latching toothing 433 of the latching rails 43, so that the carrier 41 is locked with respect to the latching rails 43 and hence is held in its respective position at the seat pan 6. Together with the carrier 41, the guide assembly 3 firmly connected with the carrier 41 and the support element 5 attached thereto also is held in position.

When the handle 20, which is arranged on the handle holder 32 of the guide assembly 3 and is coupled with the nose 423 of the actuating element 42 of the actuating assembly 4, now is actuated and for this purpose pivoted relative to the handle holder 32, the actuating element 42 is adjusted with respect to the carrier 41 in an unlocking direction E, which points in direction of the adjustment direction x, so that the pins 421 arranged on the lips 420 likewise are adjusted in the unlocking direction E and move in the coulisse 460 of the respectively associated locking bolt 46. As a result, the locking bolts 46 move inwards in the sense of the movement B indicated in FIG. 8, so that the latching teeth 461 arranged on each locking bolt 46 get out of engagement with the latching toothing 433 of the respectively associated latching rail 43 (see also FIG. 7). The locking of the carrier 41 relative to the latching rails 43 thus is released, so that the carrier 41 can be moved along the adjustment direction x relative to the latching rails 43 and hence also the guide assembly 3 with the support element 5 arranged thereon.

The actuating element 42 is pretensioned with respect to the carrier 41 via the spring 44. The pretension is such that upon actuation of the actuating element 42 as a result of pivoting the handle 20 the spring 44 is tensioned, so that a spring force of the spring 44 acts on the actuating element 42 in direction of locking (against the unlocking direction E). When the handle 20 is released after actuation, the actuating element 42 is pulled back to the carrier 41 by the spring 44 due to the pretension thereof, so that the locking bolts 46 are adjusted to the outside against the movement B and are brought in engagement with the latching rails 43.

The carrier 41 is pretensioned with respect to the latching rails 43 via the springs 45. When the carrier 41 of the actuating assembly 4 together with the guide assembly 3 arranged thereon and the support element 5 is moved with actuated actuating element 42 and unlocked locking bolts 46, the springs 45 are tensioned or relaxed, depending on the direction of movement, wherein the springs 45 advantageously are designed such that with retracted support element 5, corresponding to the position in FIGS. 3 and 8, they are tensioned and exert a pretensioning spring force on the carrier element 41 in direction of an extension, i.e. in the adjustment direction x. The extension of the support element 5 for increasing the effective length L of the seat cushion 110, 50 of the vehicle seat 1 thus is supported.

Of course, a reverse pretension to support a retraction of the support element 5 also is possible in the alternative.

As described above, the guide assembly 3 is supported on guide openings 620, 630 of the bearing blocks 621, 631 via the guide tubes 30, 31. As shown schematically in FIG. 9, the bearing is such that via the guide tubes 30, 31 the guide assembly 4 with the support element 5 arranged thereon is supported in vertical direction—corresponding to the support direction z, along which weight forces of a vehicle occupant act on the support element 5 in proper use of the vehicle seat 1—, but not in transverse direction y. This is achieved in that the guide tubes 30, 31 are guided in the respectively associated guide opening 620, 630 with a clearance S (see FIG. 9). This guidance with clearance in transverse direction y serves to avoid an overdetermination in the bearing of the guide assembly 3 and to counteract a risk of canting as a result of an overdetermination during an adjustment of the support element 5. In this respect reference is also made to DE 10 2005 029 665 A1, whose contents are to be included in the present application.

Figure 10:
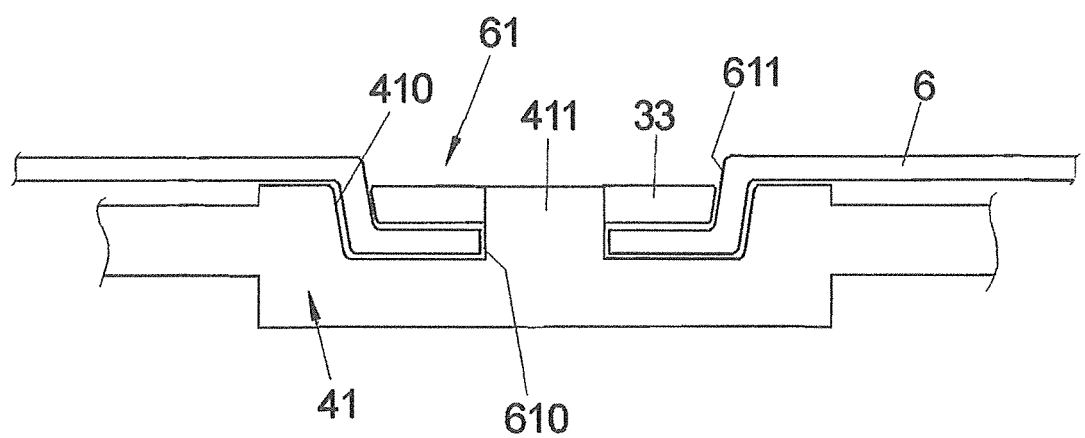
FIG. 10 shows a schematic view of the guidance of a guide web of the guide assembly on a guiding device of the seat pan.

The guide web 33 of the guide assembly 3 is guided on the guiding device 61 of the seat pan 6, which is schematically shown in a cross-sectional view in FIG. 10 in a cross-section vertical to the adjustment direction x. As shown in FIG. 10, the guide web 33 comes to lie above the seat pan 6 in the mounted condition, whereas the carrier 41 of the actuating assembly 4 is arranged below the seat pan 6. The seat pan thus extends between the guide web 33 of the guide assembly 3 and the carrier 41 of the actuating assembly 4.

The guide web 33 lies in a depression 61 of the seat pan 6 integrally molded into the seat pan 6 and realizes the first guiding device 61. The guiding device 61 here defines the guide web 33 both in vertical direction z and in transverse direction y, so that the guide web 33 is movably guided in the depression 611 in adjustment direction x, but is fixed in the guiding device 61 in the plane transverse to the adjustment direction x.

As shown in FIG. 10, the latching element 411 of the carrier 41 extends through the opening 610 of the depression 611 and connects the guide web 33 with the carrier 41. The depression 611, which is molded into the seat pan 6, lies in a bearing point 410 of the carrier 41 (see also for example FIG. 7), so that via the bearing point 410 a guidance of the carrier 41 is created on the side of the depression 611 facing away from the guide web 33, i.e. on the back of the seat pan 6.

Figure 11:
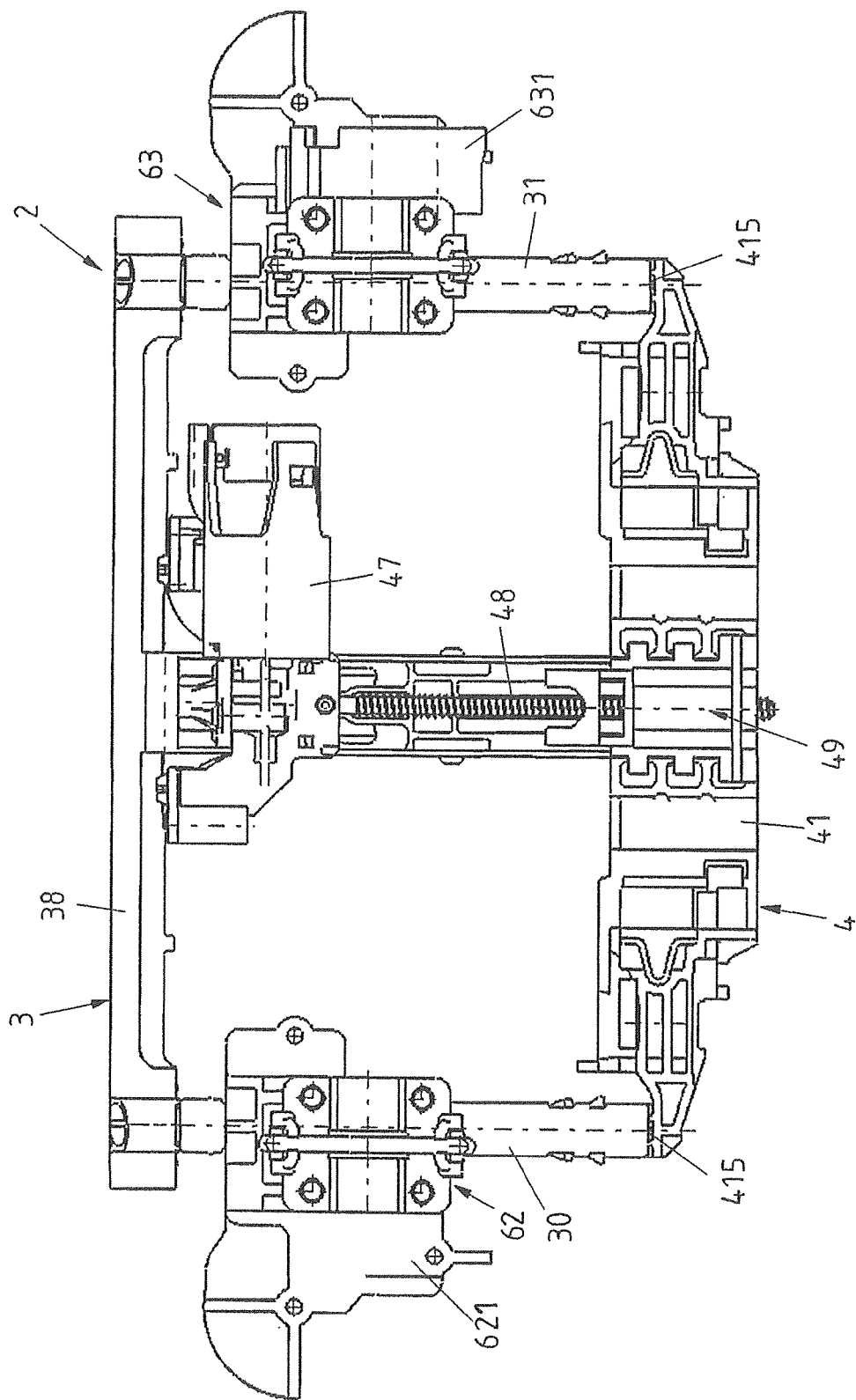
FIG. 11 shows a view from below of a seat depth adjusting means with an electromotively actuatable actuating assembly.

FIGS. 11 and 12 show two views from below of a second exemplary embodiment of a seat depth adjusting means 2, which substantially is identical in construction to the exemplary embodiment described above, whose actuating assembly 4 however is driven electromotively. The guide assembly 3 and the carrier 41 of the actuating assembly 4 here are formed identical to the one described above, and components of the same function correspondingly are provided with the same reference numerals.

In the exemplary embodiment of FIGS. 11 and 12, as compared to the exemplary embodiment explained above with reference to FIGS. 2 to 10, the actuating element 42 and the latching rails 43 with the locking latching mechanism are replaced by an electromotive drive unit 47, which is connected with a spindle 48 and realizes a spindle gear unit. The drive unit 47 here is operatively connected with an end of the spindle 48 and is formed to put the spindle 48 into a rotary movement about its longitudinal axis (directed along the adjustment direction x), wherein a stationary spindle nut 49 is arranged at the carrier 41 (not shown in detail in FIGS. 11 and 12), which in a manner known per se is in engagement with an external thread of the spindle 48 and rolls off on the spindle 48, so that as a result of a rotary movement of the spindle 48 the carrier 41 is adjusted along the spindle 48 together with the guide assembly 3 arranged thereon.

The assembly of the seat depth adjusting means 2 shown in FIGS. 11 and 12 is analogous to the one described above for the exemplary embodiment of FIGS. 2 to 10. Now, the actuating assembly 4 with the drive unit 47 and the carrier 41 initially is attached to the seat pan 6, in that the drive unit 47 is screwed for example to the seat pan 6, in order to subsequently bring the guide assembly 3 with the guide tubes 30, 31 in engagement with the connecting pins 415.

For the remaining construction and mode of function of the seat depth adjusting means 2 reference is made to what has been explained above with respect to the exemplary embodiment of FIGS. 2 to 10, in particular with regard to the guidance of the guide assembly 3 on the seat pan 6 and the connection of the support element 5 with the guide assembly 3.

The invention claimed is:

1. A vehicle seat, comprising
a seat pan for carrying a seat cushion of the vehicle seat,
a support element adjustable relative to the seat pan along an adjustment direction for carrying an additional cushion adjustable relative to the seat cushion of the seat pan,
a seat depth adjusting device arranged on the seat pan for adjusting the support element relative to the seat pan, wherein the seat depth adjusting device includes a guide assembly carrying the support element and an actuating assembly for actuating the seat depth adjusting device, and
a guide mechanism by means of which the guide assembly is movably guided on the seat pan along the adjustment direction,
wherein the guide mechanism comprises a first guiding device which includes a depression formed in the seat pan and the guide assembly includes a guide web extending along the adjustment direction and connected with the support element, which is guidable along the depression,
wherein the guide web of the guide assembly is arranged above the seat pan on a side of the seat pan facing the seat cushion such that with weight forces acting on the support element in proper use the guide web is supported on the seat pan,
wherein the actuating assembly comprises a carrier which is arranged below the seat pan, and
wherein the first guiding device includes an opening extending along the adjustment direction, via which the guide web of the guide assembly of the seat depth adjusting device is fixedly connected with the carrier of the actuating assembly of the seat depth adjusting device such that the guide web is movable together with the carrier along the adjustment direction.

2. The vehicle seat according to claim 1, wherein by means of the first guiding device the guide assembly of the seat depth adjusting device, which carries the support element, is supported substantially without clearance along a support direction, in which weight forces act on the support element in proper use, and along a transverse direction vertical to the adjustment direction and to the support direction.

3. The vehicle seat according to claim 1, wherein the guide mechanism comprises a second guiding device by means of which the guide assembly of the seat depth adjusting device, which carries the support element, is movably guided along the adjustment direction, and which is formed in at least one bearing block of the seat pan, wherein the second guiding device is formed by two guide openings each of which is formed in a bearing block of the seat pan, wherein the guide assembly of the seat depth adjusting device includes two guide tubes longitudinally extending along the adjustment direction and being guided at the guide openings.

4. The vehicle seat according to claim 3, wherein the guide openings are spaced from each other in a transverse direction transversely to the adjustment direction.

5. The vehicle seat according to claim 3, wherein in proper use the guide tubes extend below the seat pan on a side of the seat pan facing away from the seat cushion.

6. The vehicle seat according to claim 3, wherein the guide tubes each are connected with the actuating assembly with their one end and with a cross-beam of the guide assembly with their other end.

7. The vehicle seat according to claim 6, wherein on the cross-beam, at the points at which the cross-beam is connected with the guide tubes, first fixing points are arranged for connection of the support element.

8. The vehicle seat according to claim 7, wherein the guide assembly includes a portion longitudinally extending from the cross-beam and arranged between the guide tubes as seen transversely to the adjustment direction, on which a further fixing point offset to the first fixing points along the adjustment direction is arranged for connection of the support element.

9. The vehicle seat according to claim 8, wherein the cross-beam is arranged on an edge portion of the support element located away from the seat pan and the further fixing point is offset from the edge portion of the support element towards the seat pan along the adjustment direction.

10. The vehicle seat according to claim 3, wherein by means of the second guiding device the guide assembly of the seat depth adjusting device, which carries the support element, is guided substantially without clearance along a support direction, in which in proper use weight forces act on the support element, but is guided with clearance along a transverse direction vertical to the adjustment direction and to the support direction.

11. The vehicle seat according to claim 1, wherein the actuating assembly is formed for manual actuation, and includes
    at least one latching rail on which the carrier is movably guided, and
    an actuating element movably arranged on the carrier, which is formed to cooperate with at least one locking bolt shiftably mounted on the carrier, wherein in a locked condition the at least one locking bolt lockingly is in engagement with the at least one latching rail and in an unlocked condition is not in engagement with the at least one latching rail,
wherein for attachment of the actuating assembly to the seat pan the at least one latching rail is connected with the seat pan.

12. The vehicle seat according to claim 1, wherein the actuating assembly is formed for electromotive actuation, and includes
    a spindle, the carrier being in engagement with the spindle via a spindle nut,
    an electromotive drive unit for driving the spindle into a rotary movement, and
    wherein for attachment of the actuating assembly to the seat pan the electromotive drive unit is connected with the seat pan.

13. A method for assembly of a vehicle seat, which includes
    a seat pan for carrying a seat cushion of the vehicle seat,
    a support element adjustable relative to the seat pan along an adjustment direction for carrying an additional cushion adjustable relative to the seat cushion of the seat pan,
    a seat depth adjusting device to be arranged on the seat pan for adjusting the support element relative to the seat pan, wherein the seat depth adjusting device includes a guide assembly for carrying the support element and an actuating assembly for actuating the seat depth adjusting device, and
    a guide mechanism arranged on the seat pan, by means of which the guide assembly is to be movably guided on the seat pan along the adjustment direction, the guide mechanism including a first guide device which includes a depression formed in the seat pan, wherein for assembly
the actuating assembly of the seat depth adjusting device is arranged on the seat pan,
the guide assembly of the seat depth adjusting device is arranged on the seat pan, in that the guide assembly is brought in engagement with the guide means mechanism and subsequently is connected with the actuating assembly, and
the support element is connected with the guide assembly, wherein the guide assembly includes a guide web which longitudinally extends along the adjustment direction and is connected with a cross-beam of the guide assembly, wherein for assembly
the guide web is arranged on the first guiding device of the guide mechanism, the guide web being arranged on a side of the seat pan facing the seat cushion in proper use, and
the guide web is fixedly connected with a carrier of the actuating assembly arranged below the seat pan in that the guide web is connected with the carrier of the actuating assembly via an opening of the first guiding device formed in the seat pan such that the guide web is movable together with the carrier along the adjustment direction.

14. The method according to claim 13, wherein the guide assembly is arranged on the guide mechanism along the adjustment direction, in order to be connected with the actuating assembly.

15. The method according to claim 13, wherein the actuating assembly is fixed below the seat pan on a side of the seat pan facing away from the seat cushion in proper use.

16. The method according to claim 13, wherein the guide assembly includes at least one guide tube which longitudinally extends along the adjustment direction and is connected with said cross-beam of the guide assembly, wherein for assembly the at least one guide tube is arranged on a second guiding device which is arranged on a side of the seat pan facing away from the seat cushion in proper use.

17. The method according to claim 16, wherein the at least one guide tube is connected with a carrier of the actuating assembly movably guided on the seat pan.

18. The method according to claim 16, wherein the at least one guide tube is inserted into a guide opening formed in a bearing block of the seat pan for supporting a transverse tube and is connected with the actuating assembly.

\* \* \* \* \*